(No Model.) 2 Sheets—Sheet 1.
C. S. BRADLEY.
PROCESS OF OBTAINING METALS FROM THEIR ORES OR COMPOUNDS BY ELECTROLYSIS.
No. 464,933. Patented Dec. 8, 1891.
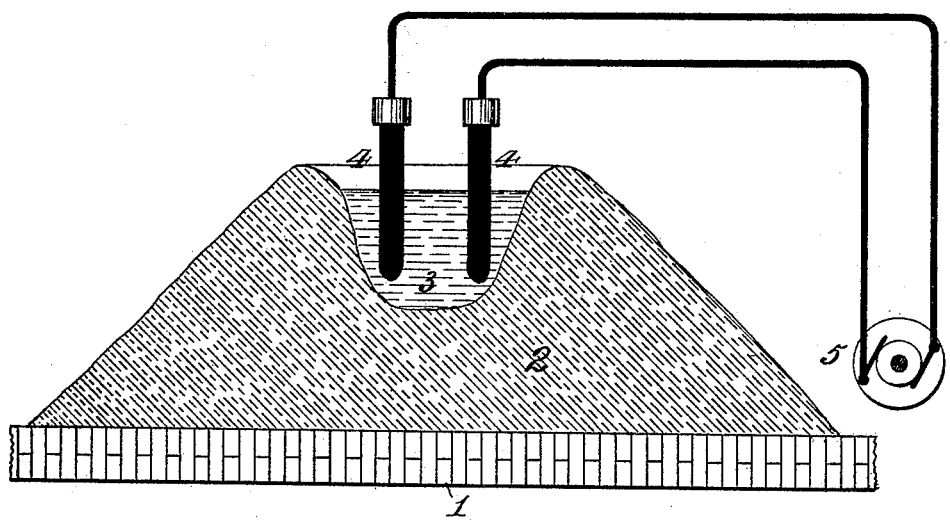
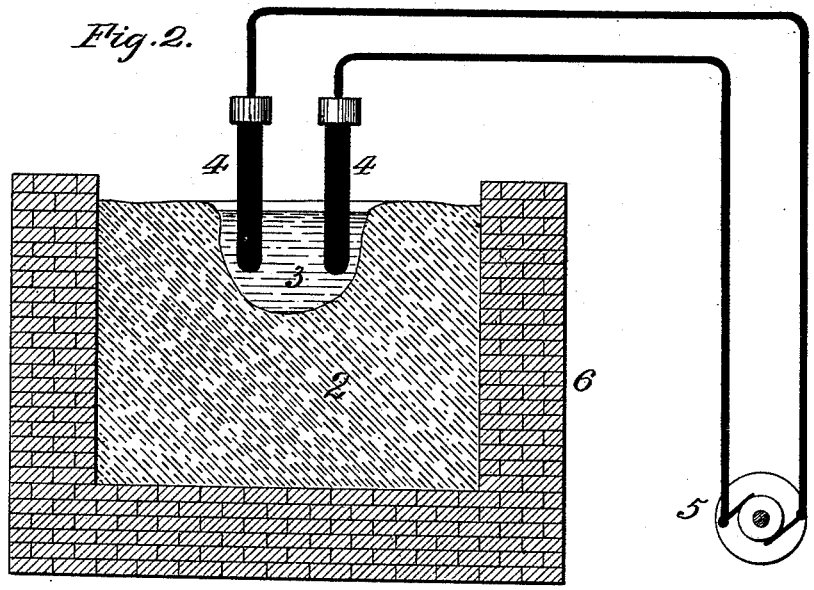

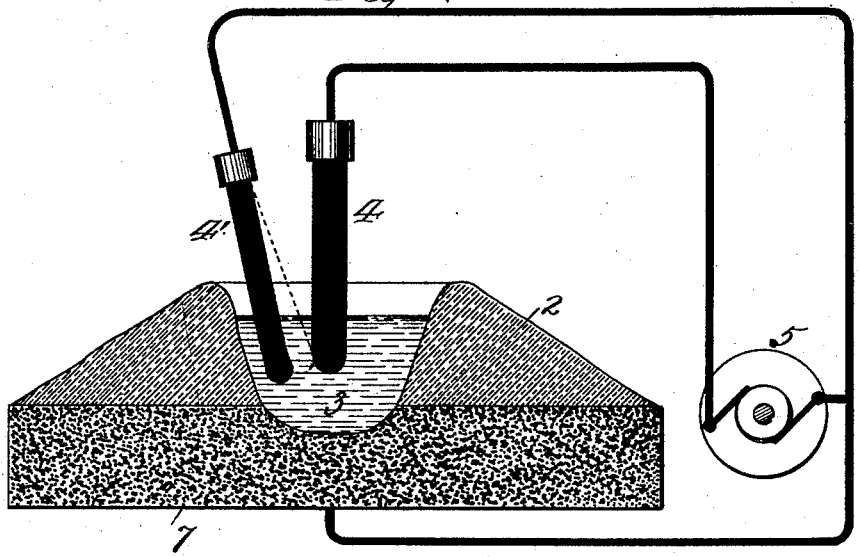
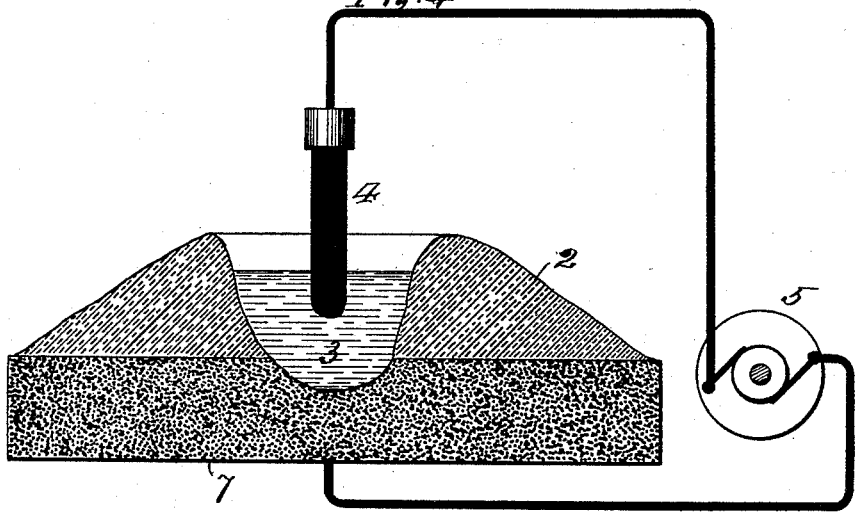

UNITED STATES PATENT OFFICE.

CHARLES S. BRADLEY, OF YONKERS, NEW YORK.

PROCESS OF OBTAINING METALS FROM THEIR ORES OR COMPOUNDS BY ELECTROLYSIS.

SPECIFICATION forming part of Letters Patent No. 464,933, dated December 8, 1891.

Original application filed February 23, 1883, Serial No. 85,957. Divided and this application filed September 14, 1889. Renewed March 16, 1891. Serial No. 385,150. (No model.)

*To all whom it may concern:*

Be it known that I, CHARLES S. BRADLEY, a citizen of the United States, residing at Yonkers, in the county of Westchester and State of New York, have invented certain new and useful Improvements in Processes of Obtaining Metals from their Ores or Compounds by Electrolysis, (Divisional Case "B" of Serial No. 85,957;) and I do hereby declare the following to be a full, clear, and exact description of the invention, such as will enable others skilled in the art to which it appertains to make and use the same.

My invention relates to the process of effecting the reduction of minerals or other compound chemical substances while in a state of fusion by the electrolytic action of an electric current; and it is especially designed for the extraction of metals from their ores or compounds and their reduction to the metallic state—for example, the extraction of aluminium from one of its ores, say cryolite. Hitherto this process has been carried on by subjecting the fused ore to the action of the current in a crucible or other refractory vessel placed in a heating-furnace where the temperature is sufficiently high to keep the ore in a melted condition; but the greatest difficulty is encountered in preventing the destruction of the crucible with this mode of working the process, for it has been found that, in the case of cryolite especially, which is a double fluoride of aluminium and sodium, the fused ore unites or fluxes with the crucible itself, and that the gas liberated in the process of reduction (fluorine gas) attacks the material of which the crucible is composed, and the consequence is that the crucible is quickly destroyed. This destructive fluxing action takes place to a greater or less extent in treating almost any material, and is greatly aggravated by the fact that the crucible is subjected to heat from without; but even in the case of materials which do not exert a fluxing action the mere mechanical action of the external heat is sufficient to make it almost impossible to prevent the cracking of the crucibles.

The main objects of my invention therefore are to dispense with a separate crucible or refractory vessel for holding the melted ore and to dispense with the external application of heat to the ore to keep it fused. I employ an electric current of greater strength or intensity than would be required to produce the electrolytic decomposition alone, and I maintain the ore or other substance in a state of fusion by the heat developed by the passage of the current through the melted mass, so that by my invention the electric current is employed to perform two distinct functions, one of these being to keep the ore melted by having a portion of the electrical energy converted into heat by the electrical resistance offered by the fused ore, and the other being to effect the desired electrolytic decomposition, by which means the heat being produced in the ore itself is concentrated at exactly the point where it is required to keep the ore in a state of fusion.

My invention consists in employing a body or heap of the ore itself to constitute the vessel or cell in which the reduction takes place, which is not destroyed by the chemical action of the fused ore and the gas liberated, and which therefore admits of the process being perfectly continuous, nothing being required but the charging of fresh ore as fast as the reduction goes on, either from without or from the sides or walls of the heap itself.

To enable others to carry out my process, I will proceed to describe as applied in one particular case to the extraction of aluminium from its ore cryolite.

In the accompanying drawings, which form part of this specification, Figure 1 is a sectional view of the pile of ore with the electrodes in position in the basin and connected to a source of electric current. Figs. 2, 3, and 4 are modified arrangements.

Upon a hearth 1, of brick or other suitable material, is piled a heap or body 2 of the ore, more or less pulverized, and a cavity or basin 3 is excavated in the top of the heap to contain the fused portion of the ore which is to be treated electrolytically. In order to fuse the ore at the start, I take two electrodes 4, composed of carbon or other suitable material and connected, respectively, to the two poles of a dynamo-electric machine 5 or other source of current, bring the said electrodes into contact, separate them sufficiently to produce an electric arc, and then thrust them down into the ore lying at the bottom of the cavity or basin, where the ore soon fuses by the heat of the arc and becomes a conducting-electrolyte, through which the current from the electrodes continues to flow. The arc of course ceases to exist as soon as there is a conducting-liquid—the fused ore—between the electrodes, and the passage of the current then takes place through the fused ore by conduction and the heat is produced as it is in an incandescent lamp. The arc is merely used to melt the ore in the beginning, and the ore is kept melted by incandescence, so to speak, the metallic aluminium being gradually deposited at the cathode and the fluorine gas being set free at the anode so long as the ore is maintained in a state of fusion. As soon as the action is properly started the electrodes should be moved a little farther apart in order that the metal set free at the cathode shall not form a short circuit between the electrodes or be attacked by the fluorine set free at the anode. I have spoken several times of fluorine being set free, although I am aware that it is considered to be almost impossible to isolate that element. I use the term "fluorine" merely for convenience, meaning thereby whatever is set free at the anode, which may be fluorine or some compound of fluorine with the substance composing the anode, moisture of the air, &c. As a matter of fact, when the process is worked fumes arise at the anode; but the anode is not attacked or eaten away very rapidly, provided it is made of pure carbon, such as gas-retort carbon, which I prefer to carbon containing silica or alumina.

In working my process I employ, as I have already stated, an electric current sufficiently powerful not only to effect the electrolytic decomposition of the ore treated, but also to develop by its passage the heat required to keep the ore fused. I have found that by using an electric current about twice as strong as would be employed to perform a given amount of electrolytic work in the ordinary way in externally-heated crucibles I am enabled to keep the ore fused according to my invention without the application of any external heat whatever. For the purpose of perfectly managing and controlling my process I have my electric generator or source of current so arranged that the strength of the electrolytic current may be properly regulated and the mass of ore thereby kept at the proper temperature. The most efficient way to accomplish this is to raise or lower the electro-motive force of the generator by any of the well-known methods employed—for example, in incandescent electric lighting. By these means I am enabled to dispense with the necessity of keeping the ore in a fused state by the application of heat from without through the walls of the refractory vessel and to concentrate the heat required for this purpose just where it is needed, between the two electrodes, and by the use of a vessel or cavity formed of the ore itself I avoid its destruction by the action of the melted ore and by the gas or acid set free during decomposition. The body of unfused ore may either be formed into an unconfined pile, as in Fig. 1, or it may be contained in a receptacle or box 6 of any desired shape, so as practically to form a tank or holder lined with the ore itself, as in Fig. 2. Such a lining will prevent the destruction of the holder and the process may go on indefinitely without interruption.

It is obvious that other chemical and metallurgical processes may be carried on according to my invention in substantially the same manner as that I have described.

In the modified arrangement illustrated by Fig. 3 the body 2 of ore is heaped upon a slab of carbon 7, which is connected to one of the poles of the dynamo-electric machine 5. The electrodes 4 and 4' are first brought together and inserted in the basin 3 into the contained ore and then separated to form the arc, as previously described, and when the heat has melted down a portion of the ore, so as to form a conductor, the electrode 4' may be withdrawn and the operation thereafter continued between the electrode 4 and the carbon slab 7. In Fig. 4 the arrangement is the same, except that the electrode 4' is omitted, and in this instance the operation is started by first establishing contact between the electrode 4 and the carbon slab 7, and then the former is withdrawn as soon as a sufficient quantity of fused ore is present to conduct the current and effect the required results.

I do not herein lay claim, broadly, to the process of obtaining metals from their ores or compounds, consisting in maintaining the ore or compound in a fused or molten condition by the passage of an electric current therethrough and electrolytically decomposing such ore or compound, nor to the process of obtaining metals from their ores or compounds, consisting in first fusing the ore or compound by the direct passage of an electric current therethrough and then while maintaining the fused condition by said current also electrolytically decomposing the ore or compound, nor to the process of obtaining metals from their ores or compounds, consisting in maintaining the ore or compound in a fused or molten condition by the direct passage of an electric current therethrough, simultaneously electrolytically decomposing the ore or compound, and regulating the strength of the said current in accordance with the requirements of the fused mass, as such processes form the subject-matter of my original application, Serial No. 85,957, filed February 23, 1883, of which this application is a division.

I claim as my invention—

1. The process of obtaining metals from their ores or compounds, consisting in passing an electric current through a fused portion of the ore or compound contained in an unfused body or heap of said ore or compound.

2. The process of obtaining aluminium from its ores or compounds, consisting in passing an electric current through a fused portion of the aluminium ore or compound contained in an unfused body or heap of said ore or compound.

3. The process of obtaining metals from their ores or compounds, consisting in maintaining in a fused or molten condition by the passage of an electric current through a portion of the ore or compound contained in an unfused body or heap of the said ore or compound and simultaneously electrolytically decomposing said fused ore or compound.

4. The process of obtaining aluminium from its ores or compounds, consisting in maintaining in a fused or molten condition by the passage of an electric current a portion of the aluminium ore or compound contained in an unfused body or heap of the said ore or compound and simultaneously electrolytically decomposing said fused ore or compound.

In testimony whereof I affix my signature in presence of two witnesses.

CHARLES S. BRADLEY.

Witnesses:
   GEO. WORTHINGTON,
   TIMOTHY W. SPRAGUE.